United States Patent
Leinonen et al.

(10) Patent No.: US 10,341,875 B2
(45) Date of Patent: Jul. 2, 2019

(54) METHOD AND ARRANGEMENT FOR MULTI BAND COMMUNICATION

(71) Applicant: Telefonaktiebolaget LM Ericsson (publ), Stockholm (SE)

(72) Inventors: Marko E. Leinonen, Haukipudas (FI); Kauko Heinikoski, Oulu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 15/509,655

(22) PCT Filed: Sep. 15, 2014

(86) PCT No.: PCT/SE2014/051063
§ 371 (c)(1),
(2) Date: Mar. 8, 2017

(87) PCT Pub. No.: WO2016/043634
PCT Pub. Date: Mar. 24, 2016

(65) Prior Publication Data
US 2017/0251374 A1    Aug. 31, 2017

(51) Int. Cl.
*H04B 1/00* (2006.01)
*H04L 5/00* (2006.01)
(Continued)

(52) U.S. Cl.
CPC .......... *H04W 16/14* (2013.01); *H04B 1/00* (2013.01); *H04B 1/005* (2013.01); *H04B 1/0057* (2013.01); *H04L 1/1829* (2013.01); *H04L 5/001* (2013.01); *H04L 5/0032* (2013.01); *H04L 5/14* (2013.01); *H04L 27/0006* (2013.01); *H04W 74/008* (2013.01); *H04W 76/10* (2018.02);
(Continued)

(58) Field of Classification Search
CPC ...... H04W 16/14; H04W 76/10; H04B 1/005; H04B 1/0057; H04B 1/00; H04B 17/18; H04L 5/001; H04L 5/14
See application file for complete search history.

(56) References Cited

U.S. PATENT DOCUMENTS 8,385,305 B1    2/2013    Negus et al.
2012/0052822 A1    3/2012    Monroe
(Continued)

FOREIGN PATENT DOCUMENTS

EP    2696530 A2    2/2014
WO    2014104961    7/2013

OTHER PUBLICATIONS

Supplementary European Search Report—EP 14901955.6—dated Apr. 18, 2018—pp. 9.

*Primary Examiner* — Omer S Mian
(74) *Attorney, Agent, or Firm* — Sage Patent Group

(57) ABSTRACT

Herein a Radio Access node for multi band communication and a method therein are described. The Radio Access node is configured for communication with at least one wireless device in a first frequency band. The method comprises performing at least one measurement in a second frequency band, by use of a feedback receiver. The at least one measurement is performed in order to detect signals, in the second frequency band, produced by other entities than the Radio Access node. The feedback receiver is also operable to measure signals transmitted by the Radio Access node.

16 Claims, 7 Drawing Sheets

(51) Int. Cl.
    *H04L 5/14*       (2006.01)
    *H04W 74/00*    (2009.01)
    *H04W 16/14*    (2009.01)
    *H04L 27/00*     (2006.01)
    *H04L 1/18*       (2006.01)
    *H04W 76/10*    (2018.01)
    *H04W 84/04*    (2009.01)
    *H04W 88/06*    (2009.01)
    *H04W 52/38*    (2009.01)
    *H04B 17/18*    (2015.01)

(52) U.S. Cl.
    CPC ............ *H04B 17/18* (2015.01); *H04L 5/0023* (2013.01); *H04W 52/38* (2013.01); *H04W 84/042* (2013.01); *H04W 88/06* (2013.01)

(56) References Cited

U.S. PATENT DOCUMENTS

| | | | |
|---|---|---|---|
| 2013/0163447 A1 | 6/2013 | Koskela et al. | |
| 2014/0029683 A1 | 1/2014 | Morris et al. | |
| 2014/0293789 A1* | 10/2014 | Machida | H04L 45/121 370/235 |
| 2016/0338019 A1* | 11/2016 | Ratasuk | H04L 5/001 |
| 2017/0181022 A1* | 6/2017 | Yang | H04W 24/10 |

* cited by examiner

METHOD AND ARRANGEMENT FOR MULTI BAND COMMUNICATION

TECHNICAL FIELD

The solution described herein relates generally to multi band communication in a wireless communication network, and in particular to configuring communication in a second frequency band.

BACKGROUND

In most countries, the frequency spectrum is divided between different activities or actors. For example, part of the available frequencies may be reserved for a certain radio access technology and/or for a certain operator of a wireless communication system.

The amount of frequency resources is limited, and the demand for bandwidth is high, making reserved frequency resources very expensive. In order to use the frequency resources more efficiently, the idea of sharing unlicensed bandwidth has been introduced. In line with this, a new concept has been developed: the LTE-U, i.e. LTE in Unlicensed. According to the LTE-U concept, an LTE system can be applied to other frequencies than the ones standardised for LTE in 3rd Generation Partnership Project, 3GPP, standards.

The first implementation of the LTE-U most probably will take place in USA, and the focus in regard of unlicensed frequency bands has particularly been directed to the 5 GHz band, which is currently used mostly for Wifi. It has been proposed to first deploy LTE-U as a Supplemental Downlink, SDL, in the frequency band 5725-5850 MHz in USA, together with a Primary Cell, PCell, operating on a carrier in a licensed band. As an example 3GPP specified band 4 may be used for the Primary Cell.

An air interface for LTE-U is shown in FIG. 1. The wireless device, WD, 101 is connected to an LTE network via two air-interfaces: the Primary Carrier 102 which is in a 3GPP LTE frequency band, and the Secondary Carrier 103 which is in an unlicensed frequency band, e.g. an ISM band. In the first implementations the Secondary Carrier will operate in an SDL mode, only carrying data in the Downlink, DL direction, i.e. from the Radio Access, RA, node to a WD. The RA node could alternatively be denoted e.g. Radio Base Station, RBS, and the WD could alternatively be denoted e.g. User Equipment, UE.

A Primary Carrier 102, or PCell Carrier, may be configured for LTE FDD or TDD, and is intended to provide control signalling, mobility and user data in a licensed or otherwise reserved frequency band. A Secondary Carrier 103, on the other hand, will be configured in an unlicensed spectrum, e.g. with so-called Best-effort user data in the downlink. In the future, the Secondary Carrier is intended to also carry uplink data from a WD to an RA node. Then, the Secondary Carrier may be used as a bi-directional communication channel, and therefore, a two headed arrow has been used to illustrate this carrier in FIG. 1.

The first LTE-U RA node implementations are assumed to be similar to the one shown in FIG. 2. In FIG. 2, the LTE RA node, or eNB, is a dual band RA node, where the first operational band, i.e. the Primary Cell, is operating in 3GPP band 4 for transmission and reception, and the SDL cell, which is downlink-only operates at 5725-5850 MHz, which is a frequency band that can also be used by e.g. 5 GHz Wifi.

Thus, an RA node is needed, which is operable in dual bands, of which at least one may be unlicensed.

SUMMARY

The object of the herein disclosed method and RA node is to solve the problem of how to configure a dual band radio apparatus that can measure and monitor activities in a frequency band in order to detect and select an operational frequency which is not subjected to interference from any transmissions, or at least only from transmission with a low enough transmission level. This object is achieved by utilizing a feedback receiver for performing at least one measurement in a second frequency band in order to detect signals produced by other entities than the RA node. The method and RA node further solves the problem of how a radio apparatus, which only has a transmitter branch and no receiver branch, can monitor activities in a frequency band in order to detect and select an operational frequency/radio channel.

According to a first aspect a method is provided for multi band communication. The method is to be performed by an RA node of a wireless communication network. The RA node is operable to communicate with at least one wireless device, WD, in a first frequency band. The method comprises performing at least one measurement in a second frequency band, by use of a feedback receiver, in order to detect signals produced by other entities than the RA node. The feedback receiver is also operable to measure signals transmitted by the RA node. The method further comprises selecting an operational frequency within the second frequency band, based on the performed at least one measurement. The operational frequency is selected for communication with the at least one WD.

According to a second aspect, an RA node is provided for multi band communication. The RA node is operable in a wireless communication network, and is configured for being operable to communicate with at least one wireless device, WD, in a first frequency band. The RA node is configured to perform at least one measurement in a second frequency band by use of a feedback receiver, in order to detect signals produced by other entities than the RA node. The feedback receiver is also operable to measure signals transmitted by the RA node. The RA node is further configured to select, based on the performed at least one measurement, an operational frequency in the second frequency band, for communication with the at least one WD.

BRIEF DESCRIPTION OF THE DRAWINGS

The objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

The examples herein are mainly described in terms of LTE, LTE-U and Wifi. However, the herein described solution may also be implemented in other systems and/or frequency bands. Regarding the alternative systems, similar conditions should apply in that the radio solution comprises a feedback receiver of the type described herein.

Figure 1:
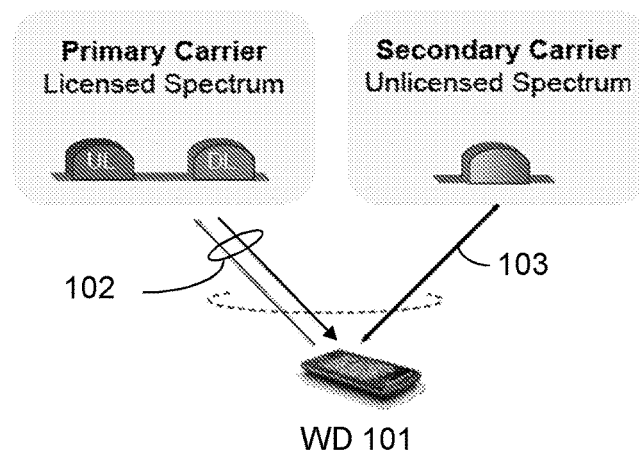
FIG. 1 illustrates an LTE-U air interface with a primary carrier and a secondary carrier.
Figure 2:
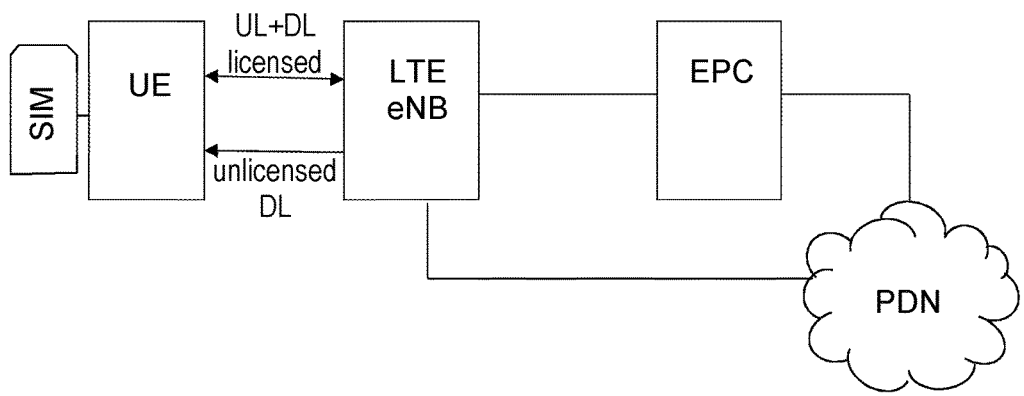
FIG. 2 illustrates a network topology for first LTE-U networks.
Figure 3:
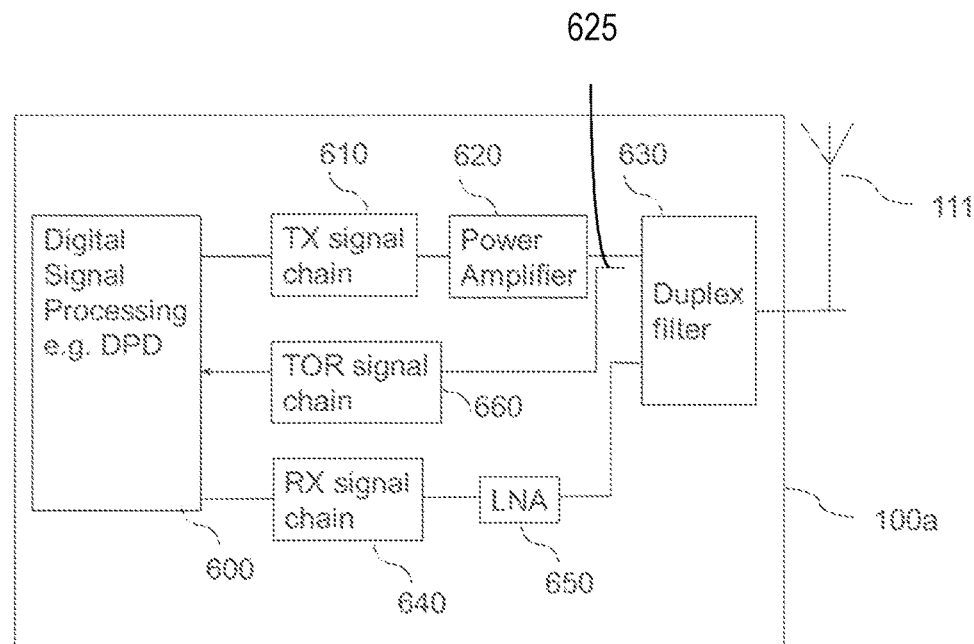
FIG. 3 is a block diagram of an FDD RA node radio solution.

A typical RA node radio solution 100a for a Primary Cell, PCell, configured for FDD communication is shown as a block diagram in FIG. 3. FIG. 3 shows a transmitter 610, a high efficiency power amplifier 620, a receiver 650 and a Low Noise Amplifier 640. FIG. 3 further shows a feedback receiver, or Transmitter Observation Receiver, TOR, 660, which is included in the radio solution 100a to provide information from the transmitter chain for the purpose of Digital PreDistortion, DPD, performed in a Digital Signal Processing unit 600. The RA node radio solution in FIG. 3 further comprises a duplex filter 630.

Figure 4:
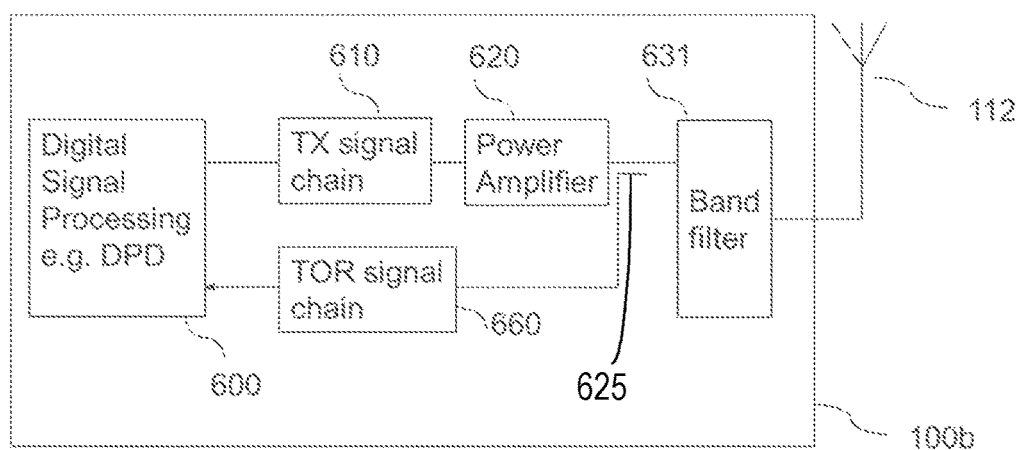
FIG. 4 illustrates a block diagram of a downlink-only RA node radio solution.

A transmitter-only RA node solution 100b for SDL radio is shown in FIG. 4. The main differences, as compared to the PCell radio solution 100a illustrated in FIG. 3, are that 100b comprises no receiver signal path, and it comprises a band pass filter 631 instead of a duplex filter.

The feedback receiver, or TOR receiver, 660 in prior art RA node radio solution is used for DPD adaptation purposes. The feedback receiver takes a copy of a transmission signal via a coupler 625 and down converts the transmission signal frequency to low intermediate frequency or base band frequency to enable signal processing. In a simplified solution, signal frequency down conversion can be implemented with a mixer.

In order to construct a dual band RA node with Primary Cell communication in a first reserved frequency band and an SDL, downlink-only, communication in a second unreserved frequency band, the radio modules 100a and 100b illustrated in FIGS. 3 and 4 can be installed into an RA node product. The RA node product may have a digital board which includes main signal processing, power conversion, back hauling, as well as all main connectors. The radio modules 100a and 100b can be attached to the digital board with board-to-board connector. The interfaces from and to radio cards 100a and 100b includes user data and control data. When the second frequency band is around 5 GHz, the radio module 100b should be configured for this frequency range.

In order to monitor the second frequency band to find an operational frequency for an SDL carrier, a Wifi card 100c may be installed along with the radio cards or modules 100a and 100b in the RA node, see FIG. 5. The Wifi card interface has user data, but no low level Layer 1, L1, data, in order to minimize the amount of data over the interface. The Wifi card 100c could detect Wifi networks during the operation of the card, and could provide signal information to the main CPU 120. The weakness of this approach is that a Wifi module would need to be included into RA node products, which would then be much more expensive than products without a Wifi module.

FIG. 5 illustrates the three radio modules 100a, 100b and 100c, comprised in an RA node, mounted on a digital board 130. The transmitter-only module 100b operates in an SDL frequency e.g. in the 5.8 GHz frequency range. The radio module 100b should preferably operate in a frequency where it will have a minimum effect on co-existing networks, such as Wifi networks and/or existing LTE-U networks. Further, the operational frequency of the radio module 100b should be selected such that it will have optimal performance for the own LTE-U transmission.

In order to achieve such selection of the operational frequency for the SDL, the RA node 10 should be able to measure and monitor any nearby e.g. Wifi networks to ensure co-operation with these networks in the second frequency band. In order to ensure proper selection of an operational frequency, the RA node 10 should have capability to detect e.g. Wifi signals which are lower than a −62 dBm level. In addition, the RA-node should be able to detect LTE-U signals in the same frequency band.

Figure 5A:
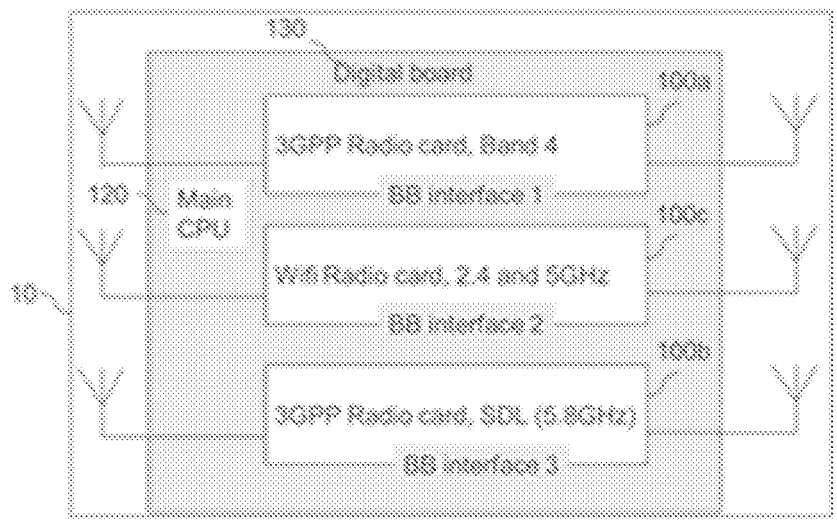
FIG. 5a illustrates an RA node radio solution comprising a Wifi module for monitoring an SDL frequency band.

In the RA node 10 illustrated in FIG. 5a, the Wifi radio module could be used for performing measurements and monitoring the activity in the Wifi frequency band around 5 GHz. However, adding a Wifi radio module to all RA nodes which possibly are to operate as dual band RA nodes e.g. in LTE-U, would make the RA nodes expensive.

If the RA node was to operate in TDD mode, one alternative to adding a Wifi module 100c would be to use the receiver branch of radio module 100a for monitoring the Wifi frequency band. This would require a down conversion of the signals, in order for the 100a receiver to be able to handle them, but would still save the cost of a Wifi module. However, this solution is not possible when the RA node is to operate in FDD mode, since then there will be no "free" time slots, as in TDD, where the receiver of radio module 100a could perform measurements in a second frequency band.

However, the inventors have realized that there is yet an alternative, namely re-using a feedback receiver for performing measurements and thus monitoring the supplementary frequency band. When faced with the idea, it may seem obvious, but the fact is that it is very unexpected that a feedback receiver would be up to the task. As previously described, the regular function of a feedback receiver is to copy a signal on a transmitter branch and provide it for signal processing. However, the inventors have investigated an exemplifying feedback receiver and analyzed its sensitivity. In table 1, the result of the investigation is shown in form of a calculation validating that a feedback receiver is able to detect the required signal power in the Wifi frequency band.

TABLE 1

Feedback receiver sensitivity analysis

| | | | |
|---|---|---|---|
| A | Thermal noise level | | −174.0 dBm/Hz |
| B | Wifi channel BW 18 MHz | 1.80E+07 | 72.6 dB |
| C | Feedback receiver NF | | 15.0 dB |
| A + B + C | Noise level in feedback receiver antenna port | | −86.4 dBm |

Figure 5B:
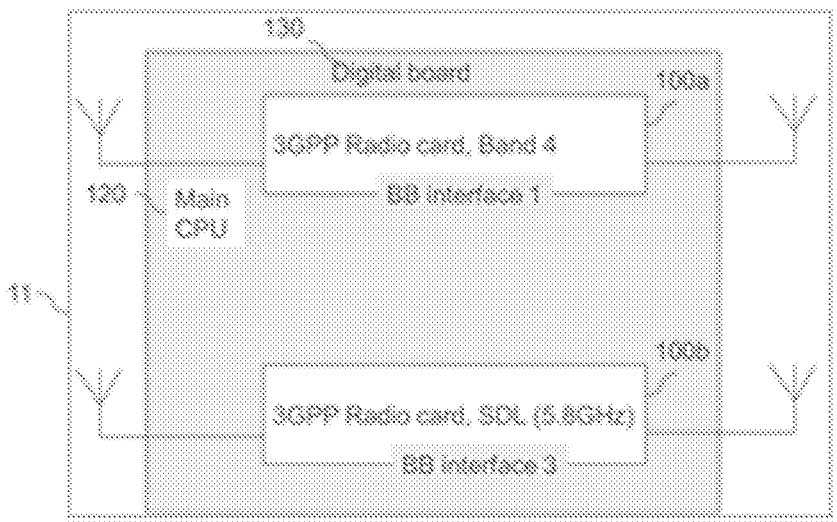
FIG. 5b illustrates an RA node radio solution, where a feedback receiver is used for monitoring an SDL frequency band, according to an exemplifying embodiment.

Thus, when applying the herein suggested solution, there will be no need for adding a Wifi card 100c for monitoring an SDL frequency band. This is illustrated in FIG. 5b, in which there is no Wifi card 100c. The RA node 11 in FIG. 5b comprises a PCell radio card 100a and an SDL radio card 100b, and here, the feedback receiver of either the SDL radio card 100b or the PCell radio card 100a is used for monitoring the SDL frequency band in order to detect and select an operational frequency for an SDL carrier.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Embodiments of a method will be described below, as seen from a perspective of an RA node, e.g. an eNB or other RBS.

Method in a Radio Access, RA, Node.

Example of embodiments of a method performed by an RA node, for multi band communication, will now be described with reference to a flowchart depicted in FIG. 6. The RA node is operable to communicate with at least one wireless device, WD, in a first frequency band. The first frequency band may be assumed to be a primary frequency band for communication, such as the frequency band used by the Primary Cell, PCell, in LTE-U, as described above. The method comprises the following actions.

Action 601

The RA node performs at least one measurement in a second frequency band, by use of a feedback receiver. The measurement is performed in order to detect signals, in the second frequency band, produced by other entities than the RA node. The feedback receiver is also operable to measure signals transmitted by the RA node.

The at least one measurement could be performed at certain occasions, e.g. at cell setup, in response to a request, or on a need basis. Alternatively or in addition, the at least one measurement could be performed periodically, e.g. at regular intervals. Further, it could be a single measurement over part of, or the whole frequency band, or, it could be a plurality of measurements covering the same and/or different parts of the second frequency band.

The use of a feedback receiver for performing the at least one measurement is central to the herein suggested solution. The feedback receiver is a receiver type that in the prior art has been used for observing signals in the transmitter branch of a radio node, such as an eNB. Such a feedback receiver is illustrated e.g. in FIGS. 3 and 4. The feedback receiver is not a receiver used for receiving regular uplink traffic, i.e. in a receiver branch of a radio node. The inventors have realized, and confirmed by calculations and tests, that such a feedback receiver could also be used for performing measurements in a frequency band, e.g. monitoring, to detect signals transmitted by other entities or nodes. According to the herein disclosed solution, the feedback receiver is used for detecting signals in a frequency band in addition to being used for observing one or more transmitters of the RA node, as previously described. By realizing that the feedback receiver could be used in this way, a costs efficient solution for multi band communication, such as LTE-U, is enabled.

The at least one measurement is performed in order to detect the radio activity in the second frequency band, such as activity related to e.g. different Wifi networks, other wireless communication systems or other cells or nodes in the wireless communication system in which the RA node is operable. That is, to detect signals in the second frequency band, which signals are not produced by the RA node itself. The RA node does not necessarily transmit any signals in the second frequency band at the time of performing the at least one measurement.

Action 602

Based on the performed at least one measurement, the RA node selects an operational frequency within the second frequency band, for communication with the at least one WD.

The at least one measurement will reveal which frequencies in the second frequency band that are used by other entities or nodes, and to which extent. Thereby, it will be possible for the RA node to select an operational frequency which is "free", or at least, a frequency where the activity is low, e.g. in which the received signal strength is below a threshold. One or more operational channel(s), e.g. multi-carrier operation may be selected based on multiple criteria related to parameters from the at least one measurement, such as interference transmission signal level from other Wifi/LTE-U networks. Further, feedback receiver measurements of a transmission signal, like ACP (Adjacent Channel Power), can be used as criteria to select operational channel to avoid interfering with existing Wifi and/or LTE-U networks.

The selection of operational frequency could, with advantage, be adaptive, and the performing of at least one measurement, or monitoring of other networks, could be performed e.g. periodically, since new ad-hoc Wifi and/or e.g. LTE-U networks or carriers may be establish in the second frequency band over time.

The feedback receiver may be used in a time shared manner for performing measurements in the second frequency band and for measurement or observation of signals transmitted by the RA node. That is, these two tasks or activities may be performed at different points in time. The inventors have found that a feedback receiver is typically occupied by observing a transmitter branch about 10% of the time. Thus, it is possible to use it for other purposes during the remaining time.

There may be more than one feedback receiver in the RA node. Assuming the RA node has two transmitters, or transmitter branches, one for a first frequency band and another for a second frequency band, there may be one feedback receiver associated with each of these transmitter branches. Alternatively, there may be only one feedback receiver associated with both transmitter branches. In the first case, either of the two feedback receivers could be used for performing the at least one measurement. There are different advantages associated with the different alternatives. For example, when a feedback receiver associated with a second frequency band is utilized for performing the at least one measurement, no additional hardware is needed for monitoring the second frequency band.

When the feedback receiver is associated with a transmitter operating in the first frequency band, the method may comprise converting a detected signal in the second frequency band to the first frequency band. The reason for doing this is that the feedback receiver in this case would be configured for operating in the first frequency band, and therefore it may be necessary to convert signals, detected in the second frequency band, from the second frequency band to the first frequency band, i.e. to the frequency band in which the feedback receiver is operable. This solution may require a mixer+VCO module for performing the down conversion. However, this solution has the advantage that all signaling information is coming to a main CPU from one radio card, and the SDL radio card may be a slave, only. Both alternatives, however, save the cost for a Wifi card, which would otherwise be needed.

Other parameters could also be selected based on the performed at least one measurement. For example, a transmission signal bandwidth and/or a transmission power for the communication with the at least one WD in the second frequency band could be selected, e.g. to optimize LTE-U performance and co-existence with other networks.

The transmission signal bandwidth should be selected in relation to the detected signals in the second frequency band, with the aim to avoid interference from and interfering with the detected signals. If there is no or little detected signal activity in the second frequency band, the signal bandwidth and the transmission power could be selected as preferred by the RA node. This could be described as that the RA node could allocate "free space" in the second frequency band, i.e. frequencies, determined based on the performed at least one measurement, which (frequencies) are not used by other entities, or only used to a certain extent by other entities.

In an exemplifying embodiment, the first frequency band is reserved for the wireless communication network in which the RA node is operable, and the second frequency band is not reserved for the wireless communication network. By reserved is meant e.g. that the operator of the wireless communication system has an exclusive license for the first frequency band, or at least some kind of priority of using the frequency band. By "not reserved" is meant that the wireless communication network in which the RA node is operable does not have an exclusive or prioritized right to the frequency band, but is one of a number of networks or actors, which may use the frequency band for communication. It is further possible that the second frequency band is reserved for some other communication network, but that other parties may use the frequency band "when free".

For example, the second frequency band could be a band such as the ones listed in 3GPP standard documents; a so-called ISM band or a so-called TV white space band. That is, the second frequency band may be available for use by a number of different actors and services, such as operators, media service providers and/or researchers.

In one embodiment, the method is applied when the RA node operates in Frequency Division Duplex, FDD, mode. The method described above could be applied both when the RA node operates in Time Division Duplex, TDD, mode and when the RA node operates in FDD mode. The method is especially beneficial in FDD mode, since in FDD mode it is not possible to use a regular receiver branch of the RA node to perform the at least one measurement, which could be an alternative in TDD mode.

When having selected the operational frequency in the second frequency band, the RA node may configure a carrier at/in this frequency for communication with the at least one WD. The communication could be downlink and/or uplink communication. This carrier could be configured e.g. in addition to a carrier configured in the first frequency band. The configuration of the carrier in the second frequency band could take place e.g. at first set up of the carrier, or when the carrier needs to be reconfigured, e.g. when a new Wifi network has been activated in the second frequency band, which interferes with the communication on the carrier.

Regarding the manner of communication with the at least one WD in the second frequency band, it could be operated, performed or executed, according to the same standard as a communication with a WD in the first frequency band, e.g. LTE. Alternatively, the communication in the second frequency band could be operated according to another standard than a communication with a WD in the first frequency band. For example, the communication in the second frequency band could be operated according to LTE TDD, while the communication in the first frequency band is operated according to LTE FDD. As previously mentioned, the herein suggested solution involves re-use of a feedback receiver for a new, unexpected purpose. The feedback receiver is re-used for performing at least one measurement in a second frequency band, when applying multi band communication. One example of such a multi band communication system is LTE-U. By applying the herein described solution, an optimal, or at least good enough, operational channel can be detected and selected for communication by an RA node.

Figure 7:
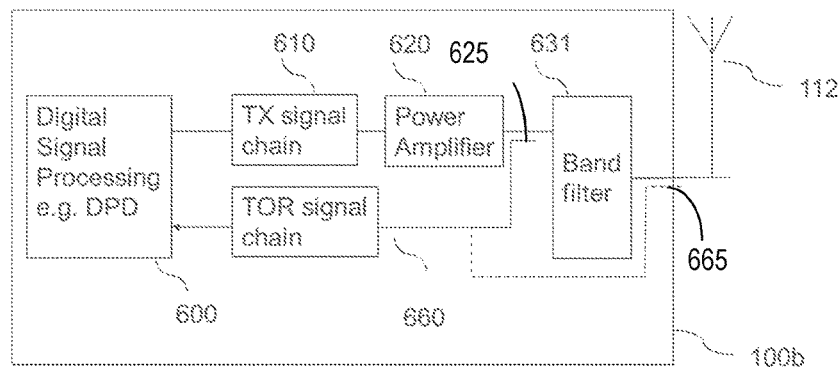
FIG. 7 illustrates an SDL transmitter feedback receiver used for SDL frequency monitoring, according to an exemplifying embodiment.
Figure 8A:
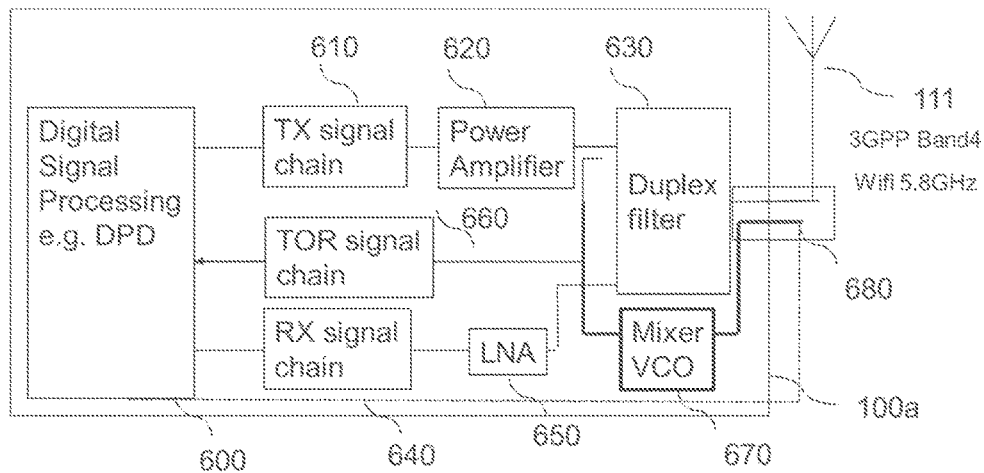
FIGS. 8a and 8b show a PCell radio solution where a feedback receiver is used for SDL frequency monitoring, with a one antenna solution 8a, and a two antenna solution 8b, according to exemplifying embodiments.

An embodiment where the feedback receiver 660 of an SDL radio 110b is used to monitor Wifi and/or LTE-U frequencies is illustrated in FIG. 7. The new task of the feedback receiver is performed when it is not used for DPD algorithm purposes, i.e. observing the transmitter. The SDL may be based e.g. on LTE TDD standard, which would mean that transmission is off periodically, and those off periods could be used as monitoring time slots. The monitoring of the second frequency band could be performed by the feedback receiver without changing the coupling to the transmitter chain of the RA node. However, it may be favorable to add a coupler 665 closer to the antenna, e.g. at the antenna port, enabling access to the signals before having been e.g. attenuated or distorted by a filter 631. Such a coupling is illustrated by a dashed line in FIG. 7. By detecting e.g. a Wifi 5 GHz signal from the antenna port prior to a duplex filter or band filter, the sensitivity is improved in detection An alternative embodiment where the feedback receiver associated with a PCell radio card is used for performing measurements in a second frequency band is illustrated in FIG. 8a. In this case a new block may be needed: a mixer+a Voltage Controlled Oscillator, VCO, module 670 configured for converting e.g. Wifi frequency 5.8 GHz to a frequency range used for transmission in the PCell, which may be e.g. 3GPP "band 4", as previously mentioned. The converted signal is then provided to the feedback receiver input 660. A Digital Signal Processor, DSP, may control the VCO frequency of the VCO module, and information about the VCO frequency and corresponding signal level can be routed to a main Central Processing Unit, CPU. As previously mentioned a feedback receiver is typically in use for observing a transmission signal about 10% of the time, and thus there is plenty of time to re-use feedback receiver for detecting other frequency signals. A new antenna resonance may be implemented for antenna 111, in order to be able to receive other frequencies, e.g. in the 5.8 GHz frequency range. The coupling of the "other frequency signals", e.g. Wifi, from the antenna signal can be done with a directional coupler 680. The coupler 680 may also be used for other purposes, like antenna mismatch observation or transmission signal level detection at the antenna port. The connection for such additional optional features for the coupler 680 is indicated with a dotted line.

Figure 8B:
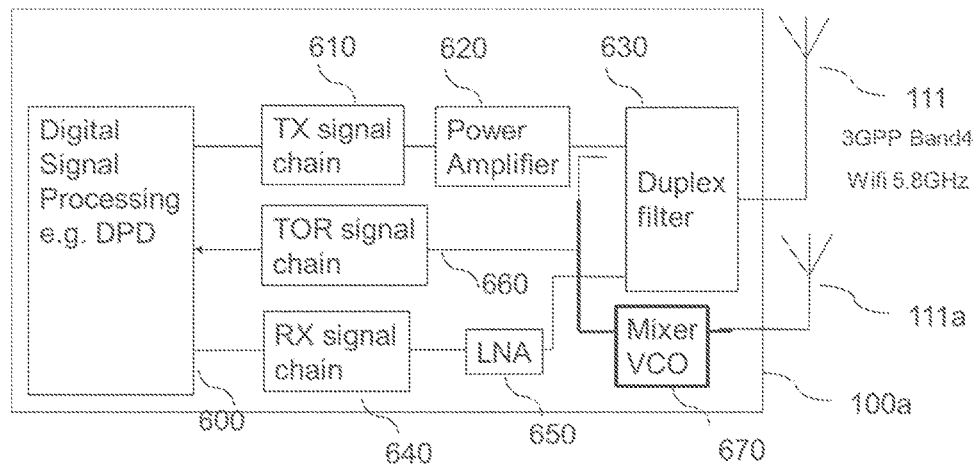

An alternative implementation of the PCell radio described above is shown in FIG. 8b. In FIG. 8b, the feedback receiver 660 is connected to a dedicated Wifi frequency antenna 111a, and the main antenna 111 can then be a single resonance antenna operational only in the PCell frequency range.

It should be understood that some filtering and similar may be beneficial or needed for the Wifi band monitoring path. However, such additional features are omitted herein for clarity reasons. An example of such an extra feature is that an external LNA could be added to the feedback receiver signal branch if the feedback receiver Noise Figure, NF, needs to be improved.

Figure 9:
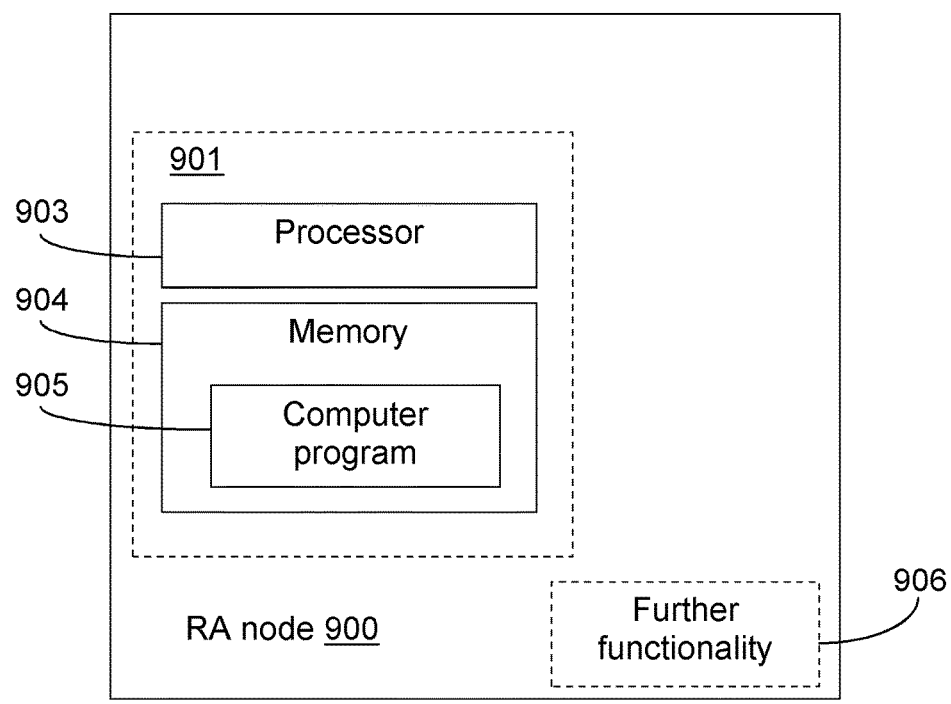
FIGS. 9 and 10 show an RA node according to exemplifying embodiments.

Below, implementations of an RA node will be described in a more general manner with reference to FIGS. 9-10. The RA node is configured to perform at least one of the method embodiments described above with reference to FIG. 6. The node will be described in brief in order to avoid unnecessary repetition.

Radio Access, RA, Node

Embodiments described herein also relate to an RA node operable in a wireless communication system. The RA node is associated with the same technical features, objects and advantages as the method described above and illustrated e.g. with reference to FIG. 6.

Below, an exemplifying RA node 900, configured for multi band communication and for being operable to communicate with at least one WD in a first frequency band will be described with reference to FIG. 9. The part of the RA node 900 which is most affected by the adaptation to the herein described method is illustrated as an arrangement 901, surrounded by a dashed line. The RA node 900 or arrangement 901 may be assumed to comprise further functionality 906, for carrying out regular RA node functions.

The arrangement part of the RA node may be implemented and/or described as follows:

The arrangement 901 comprises processing means 903, such as a processor, and a memory 904 for storing instructions, the memory comprising instructions, e.g. computer program 905, which when executed by the processing means causes the RA node 900 or arrangement 901 to perform at least one measurement in a second frequency band by use of a feedback receiver. The at least one measurement is performed in order to detect signals produced by other entities than the RA node in the second frequency band. The feedback receiver is also operable to measure signals transmitted by the RA node. The execution of the instructions further causes the RA node to select, based on the performed at least one measurement, an operational frequency in the second frequency band, for communication with the at least one WD.

The at least one measurement in the second frequency band and the measurement of signals transmitted by the RA node may be performed in a time shared manner by the feedback receiver. That is, the feedback receiver may share its time between performing the at least one measurement in the second frequency band and performing the task of observing a transmitter of the RA node, e.g. for DPD purposes.

The feedback receiver may be associated with a transmitter of the RA node, which is operable in the first frequency band, and/or, associated with a transmitter of the RA node which is operable in the second frequency band.

The execution of the instructions by the processing means may further cause the RA node to convert a detected signal in the second frequency band to the first frequency band when the feedback receiver is associated with the transmitter operable in the first frequency band.

The execution of the instructions by the processing means may further cause the RA node to select, based on the performed at least one measurement, a transmission signal bandwidth and/or a transmission power for communication with the at least one WD in the second frequency band.

The first frequency band may be reserved for the wireless communication network, and the second frequency band may not be reserved for the wireless communication network.

The second frequency band may be a 3GPP band, an Industrial Scientific Medical, ISM, band or a TV white space band.

The RA node may be configured to operate in an FDD mode.

The execution of the instructions by the processing means may further cause the RA node to configure a carrier at the selected operational frequency for communication with the at least one WD.

The RA node may further be configured to operate a communication on the second frequency band according to the same standard, or, according to another standard than a communication on the first frequency band.

Figure 10:
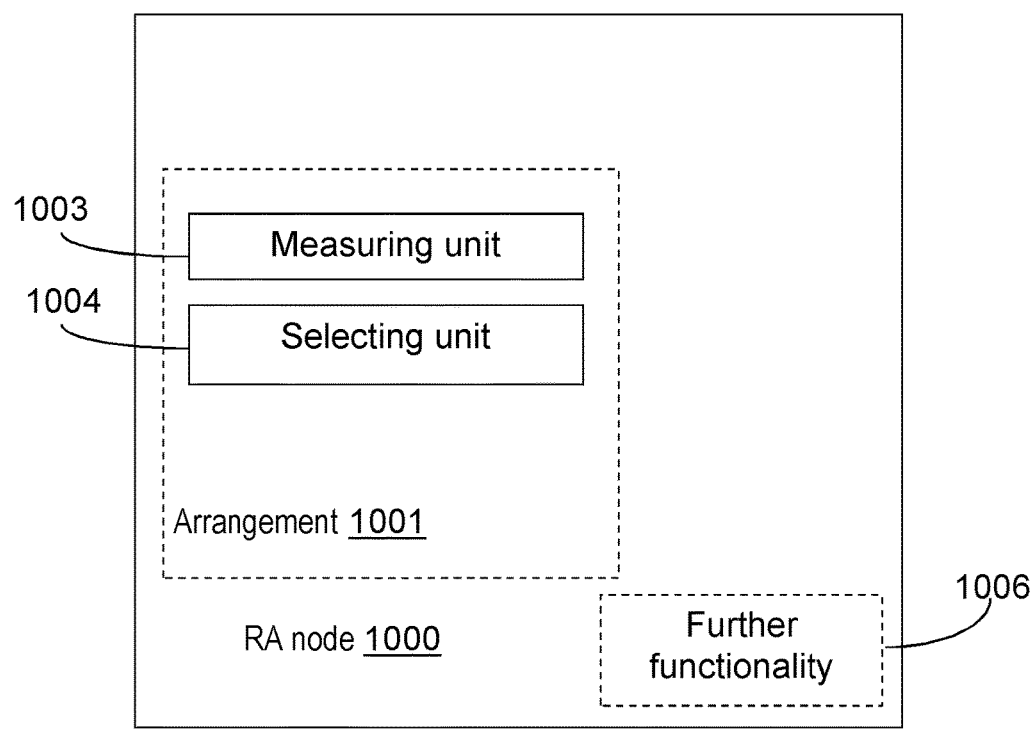

An alternative embodiment of the RA node 900 is shown in FIG. 10. FIG. 10 illustrates an RA node 1000, operable in a wireless communication network The RA node is configured for multi band communication and for being operable to communicate with at least one WD in a first frequency band. The part of the UE 1000 which is most affected by the adaptation to the herein described method is illustrated as an arrangement 1001, surrounded by a dashed line. The RA node 1000 or arrangement 1001 may be assumed to comprise further functionality 1006, for carrying out regular RA node functions.

The RA node 1000 or arrangement 1001 comprises a measuring unit 1003, configured to perform at least one measurement in a second frequency band by use of a feedback receiver, in order to detect signals produced by other entities than the RA node. The feedback receiver is also operable to measure signals transmitted by the RA node, e.g. for DPD purposes.

The RA node 1000 or arrangement 1001 further comprises a selecting unit 1004, configured to select, based on the performed at least one measurement, an operational frequency in the second frequency band, for communication with the at least one WD.

The RA node 1000 could further be configured for the different embodiments described above.

Figure 6:
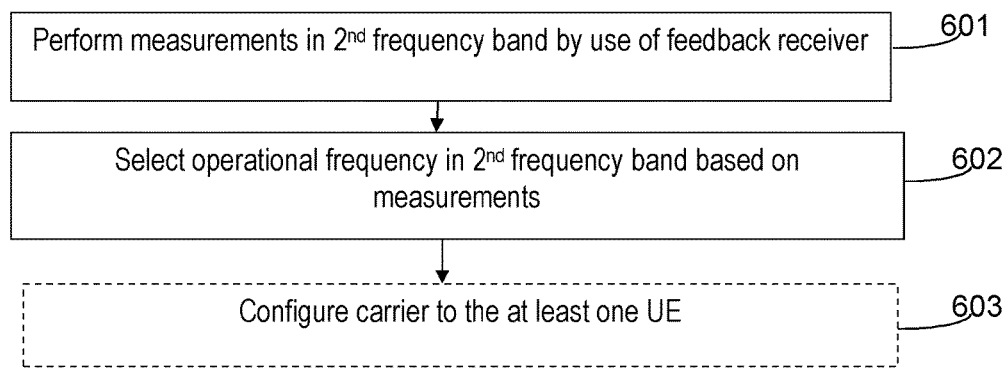
FIG. 6 illustrates a procedure in an RA node, according to an exemplifying embodiment.

The units or modules in the arrangements in the different RA node embodiments described above could be implemented e.g. by one or more of: a processor or a microprocessor and adequate software and memory for storing thereof, a Programmable Logic Device (PLD) or other electronic component(s) or processing circuitry configured to perform the actions described above, and illustrated e.g. in FIG. 6. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

ABBREVIATIONS

CPU Central Processing Unit
DFE Digital Front End
DL Downlink, transmission from RBS to UE
DPD Digital Pre Distortion
FDD Frequency Domain Division
HW Hardware
ISM band Un-licensed frequency band, Industrial Scientific Medical Band
LTE-U LTE in Unlicensed bands
PCell Primary Cell
RBS Radio Base Station
RF Radio Frequency
SDL Supplemental Downlink
TDD Time Domain Division
TOR Transmitter Observation Receiver
UE User Equipment, mobile terminal
UL Uplink, transmission from UE to RBS
VCO Voltage Controlled Oscillator
Wifi a trademark name for WLAN (Wireless Local Area Network)

The invention claimed is:

1. A method for multi band communication, performed by a Radio Access (RA) node of a wireless communication network, the RA node being operable to communicate with at least one wireless device (WD) in a first frequency band, the method comprising:
  performing at least one measurement in a second frequency band, by use of a feedback receiver, in order to detect signals produced by other entities than the RA node; wherein the feedback receiver also is operable to measure signals transmitted by the RA node;
  selecting, based on the performed at least one measurement, an operational frequency within the second frequency band for communication with the at least one WD, wherein the feedback receiver is associated with a transmitter of the RA node and is operable in the first frequency band and/or the second frequency band; and
  converting, when the feedback receiver is associated with the transmitter operable in the first frequency band, a detected signal in the second frequency band to the first frequency band.

2. The method of claim 1, wherein the feedback receiver is used, in a time shared manner, for measurements in the second frequency band and for measurement of signals transmitted by the RA node.

3. The method of claim 1, further comprising selecting, based on the performed at least one measurement, a transmission signal bandwidth and/or a transmission power for communication with the at least one WD in the second frequency band.

4. The method of claim 1, wherein the first frequency band is reserved for the wireless communication network, and the second frequency band is not reserved for the wireless communication network.

5. The method of claim 1, wherein the second frequency band is a 3rd Generation Partnership Project (3GPP) band, an Industrial Scientific Medical (ISM) band, or a TV white space band.

6. The method of claim 1, wherein the RA node operates in a Frequency Domain Division (FDD) mode.

7. The method of claim 1, further comprising configuring a carrier at the selected operational frequency for communication with the at least one WD.

8. The method claim 1, wherein the RA node communication on the second frequency band is operated according to the same standard, or according to another standard, than the communication on the first frequency band.

9. A Radio Access (RA) node for multi-band communication and operable in a wireless communication network, the RA node configured for being operable to communicate with at least one wireless device (WD) in a first frequency band; the RA node comprising:
  processing circuitry;
  memory containing instructions executable by the processing circuitry whereby the RA node is operative to:
    perform at least one measurement in a second frequency band by use of a feedback receiver, in order to detect signals produced by other entities than the RA node; wherein the feedback receiver also is operable to measure signals transmitted by the RA node;
    select, based on the performed at least one measurement, an operational frequency in the second frequency band for communication with the at least one WD, wherein the feedback receiver is associated with a transmitter of the RA node and is operable in the first frequency band and/or the second frequency band; and
    convert, when the feedback receiver is associated with the transmitter operable in the first frequency band, a detected signal in the second frequency band to the first frequency band.

10. The RA node of claim 9, wherein the RA node is configured such that the at least one measurement in the second frequency band and the measurement of signals transmitted by the RA node are performed in a time shared manner by the feedback receiver.

11. The RA node of claim 9, wherein the instructions are such that the RA node is operable to select, based on the performed at least one measurement, a transmission signal bandwidth and/or a transmission power for communication with the at least one WD in the second frequency band.

12. The RA node of claim 9, wherein the first frequency band is reserved for the wireless communication network, and the second frequency band is not reserved for the wireless communication network.

13. The RA node of claim 9, wherein the second frequency band is a 3rd Generation Partnership Project (3GPP) band, an Industrial Scientific Medical (ISM) band, or a TV white space band.

14. The RA node of claim 9, wherein the RA node is configured to operate in a Frequency Domain Division (FDD) mode.

15. The RA node of claim 9, wherein the instructions are such that the RA node is operable to configure a carrier at the selected operational frequency for communication with the at least one WD.

16. The RA node of claim 9, wherein the RA node is configured to operate a communication on the second frequency band according to the same standard, or according to another standard, than a communication on the first frequency band.

\* \* \* \* \*